United States Patent [19]

Newman

[11] 3,941,739
[45] Mar. 2, 1976

[54] FLOWABLE FLOCCULANTS FOR WATER TREATMENT

[75] Inventor: Jack R. Newman, Skokie, Ill.

[73] Assignee: Swift and Company Limited, Chicago, Ill.

[22] Filed: May 20, 1974

[21] Appl. No.: 471,316

[52] U.S. Cl. .................... 260/33.2 R; 260/33.4 R
[51] Int. Cl.$^2$ .......................................... C08K 5/06
[58] Field of Search...... 260/33.2 R, 33.4 R, 89.7 S, 260/34.2; 137/13; 210/54

[56] References Cited
UNITED STATES PATENTS

| | | | |
|---|---|---|---|
| 3,185,660 | 5/1965 | Beste | 260/34.2 |
| 3,691,123 | 9/1972 | Clarke et al. | 260/34.2 X |
| 3,776,892 | 12/1973 | Bleyle | 210/54 |
| 3,849,361 | 11/1974 | Zweigle | 260/33.2 R |

*Primary Examiner*—Lewis T. Jacobs
*Attorney, Agent, or Firm*—Edward T. McCabe; Charles E. Bouton; Raymond M. Mehler

[57] ABSTRACT

A fluidized flocculant being a dispersion of from about 5 to 60 weight percent of finely ground polyacrylamides in a fluid, water soluble polyhydric alcohol carrier. The fluidized flocculant is prepared as a dispersion having a particle size of less than 75 microns and can be metered and pumped into a water stream and mixed therewith to form a flocculant solution that can be readily metered and pumped into water to be clarified.

11 Claims, No Drawings

FLOWABLE FLOCCULANTS FOR WATER TREATMENT

This invention relates to a flowable flocculant, the method of making same, and the method of clarifying water with the flowable flocculant. A flocculant for use in aqueous systems is dispersed in a water soluble carrier to form a fluidized flocculant that is flowable at room temperatures, but still has a high solids content. The prepared fluidized flocculant may be pumped and metered into an aqueous system to accomplish desired flocculation.

Polyacrylamides and other polymeric compounds of high molecular weight are widely used as flocculants for the treatment of water in order to agglomerate and separate out suspended particles. Polyacrylamides are recognized as having superior flocculating properties. However, before these properties can be utilized, it is necessary to dissolve the polyacrylamides in the water to be treated. Once dissolved, polyacrylamides become effective flocculants for suspended material in water.

It is well known in the art, for example, as taught in U.S. Pat. No. 3,165,465, to utilize flocculants such as polyacrylamides in their dry, powdery form. Commercial use of such dry flocculants has proved to be inconvenient and excessively time-consuming. One of the major difficulties is that, to completely dissolve requisite quantities of prior art commercial flake or granular form polyacrylamides into aqueous solution, constant, mechanical stirring and a minimum dissolving time of from 1 to 2 hours are needed.

Also, during the handling of dry flocculants, the flocculating agent coats surrounding objects. Removal of spilled material is extremely difficult because of the viscous nature of the solution, and if spilled material is not removed a serious safety hazard is created due to the extraordinary slickness of the wetted flocculant. Moreover, considerable care must be taken to prevent lumping as the viscosity of the flocculant solution increases to the point where the stirring action ceases to effectively suck the flocculant into the water. Such difficulties are compounded since the formation of such lumps requires excessive mixing times which can depolymerize the flocculant. Lumping can also block feeding devices or rotometers.

All of these problems are especially troublesome when one wishes to treat a continuous flow of water in an automated fashion. This treatment could, for example, take place before water is permitted to enter a natural body of water such as a river, stream or lake.

One prior art attempt to avoid some of these problems is to feed prewetted flocculant into the water in an effort to lessen the flocculant dissolving and mechanical mixing time. The flocculant is prewet by means of an eductor, which is an ejector-type device that can introduce a flocculant powder into a high velocity water stream to prewet the powder. This attempt has proved unsatisfactory. The eductor has a strong tendency to block with wetted flocculant powder, and if the water pressure is insufficient the entire device works very poorly. Moreover, mere prewetting does not fully overcome the problems encountered in dissolving a flocculant which are discussed herein.

Another attempt to solve the problems encountered in utilizing commercial flake or granular form flocculant polyacrylamides is to pre-dissolve polyacrylamides and market such as an aqueous flocculant solution. This attempt has been found to have very serious disadvantages. Polyacrylamides have very high molecular weights within a range on the order of from 300,000 to 15 million; and, apparently due to this high molecular weight, a polyacrylamides solution of a concentration greater than 2% is extremely viscous. This high viscosity makes impractical the pumping and metering of same into the water to be treated, thereby making it difficult to achieve even, automatic treatment.

An aqueous polyacrylamides solution having acceptable pumping and flowing properties has a polyacrylamides content of about 0.5 to 2% by weight. If a product this dilute is prepared, it then becomes necessary to make and ship a product that is primarily water. However, it has been found that substantially higher percentages of polyacrylamides may be dispersed in a water soluble carrier.

It is, therefore, a principal object of this invention to provide a flocculant product that is readily flowable, that is receptive to automated handling, that can be metered into a water source and dissolved therein with minimal spillage, lump formation, mixing time and inconvenience.

Another object of the present invention is the method of preparing a flowable flocculant of relatively low viscosity which is in a fluid state at room temperature.

Still another object of the present invention is a method to disperse from about 5 to 60 weight percent of a flocculating agent within a water soluble carrier with minimal damage to the flocculating agent.

A further object of the present invention is the method of providing a flowable flocculant having finely ground polyacrylamides as the flocculating agent, such flocculating agent being dispersed within a water soluble polyhydric alcohol carrier having a relatively low molecular weight and within which the flocculating agent will not dissolve to any appreciable extent, the flowable flocculant containing about 5 to 60 weight percent of the flocculating agent.

It is a still further object of the present invention to meter a finely ground flowable flocculant dispersion of polyacrylamides within a low molecular weight, water soluble polyhydric alcohol carrier, and to pump same into a source of water, quickly dissolving such flocculant in the water, whereby the polyacrylamides flocculating agent can be added to water to be treated to agglomerate impurities within the water to achieve separation of the thus agglomerated impurities from the clarified water.

The present product is a flocculant concentrate dispersion that is flowable at room temperature. The present method relates to mixing a flocculating agent and a watersoluble carrier, including milling to a fine grind, to form a flowable flocculant concentrate dispersion. The present method further relates to mixing the flowable flocculant dispersion with water and dissolving same therein to achieve flocculation of an aqueous system.

Other objects, if not set forth specifically herein, will be readily apparent to those skilled in the art from the detailed description of the invention which follows.

It has been found that the utility of flocculating agents can be quite advantageously enhanced if the flocculant is flowable and of relatively low viscosity at room temperature. To be commercially feasible, such a flowable flocculant must contain high concentrations of the flocculating agent.

The present composition includes finely ground polyacrylamides as a flocculating agent present in amounts of from 5 to 60 weight percent of the total composition. The amount of flocculating agent in the product is roughly dependent upon the fineness to which the flocculating agent is ground. Conceivably, the weight percent can be as high as 70 if particle sizes of considerably less than 75 microns could be realized without excessive polymer damage. The preferred range of polyacrylamides is from about 30 to about 40 weight percent.

Any commercially available polyacrylamides may be utilized. Polyacrylamides are copolymers of acrylic acid and acrylamide monomers. Polymerization may be accomplished by any suitable vinyl polymerization initiator, usually free radical forming compounds such as azo compounds and peroxides. The polyacrylamides may be cationic, having a molecular weight of about 6 million. They may be anionic, having a molecular weight within the approximate range of 12 to 15 million. The polyacrylamides may also be nonionic of a molecular weight range of about 12 to 15 million.

The flocculating agent is dispersed within a water soluble, low molecular weight polyhydric alcohol carrier. Preferred carriers include diethylene glycol, propylene glycol, and dipropylene glycol. A polyhydric alcohol carrier of a simpler chemical structure, such as glycerol or ethylene glycol, is an unsatisfactory carrier since the polyacrylamides tend to dissolve therein and swell, creating an undesirable degree of viscosity. The carrier, to be acceptable, must exhibit properties such that the polyacrylamides will be insoluble therein to prevent swelling of the polyacrylamides. Acceptable carriers are those that are dimers, trimers, or of higher order that have a molecular weight range of greater than 65 and less than 500, preferably the range being about 75 to 150. The preferred glycol carrier is dipropylene glycol because of its low cost, low toxicity, low volatility, and relatively low hygroscopicity.

On long standing, the flowable flocculant dispersion product tends to exhibit settling out, requiring mixing of the product prior to use. Such settling out can be reduced, if desired, by adding to the dispersion a thickening agent that is soluble in both water and carrier. Generally found to be acceptable for these purposes are polyvinyl pyrrolidone or any commercially available inorganic thickening agent such as micro-crystalline asbestos and those which are clays having a silicate base. The inclusion of any such conventional thickening agent is optional. If present, the thickening agent comprises about 0.1 to 20% by weight of the total composition. The preferred range is approximately 0.5 to 10% by weight.

The present inventive method includes mixing at atmospheric pressure from about 5 to about 60 weight percent polyacrylamides with from about 30 to about 95 weight percent based on the final composition of a polyhydric alcohol carrier to form a dispersion. The carrier is water soluble and is one in which polyacrylamides are not soluble. Carriers found to be particularly suitable are glycols that have a molecular weight of greater than 65 and less than 500, preferably between 75 and 150. The prepared mixture or slurry is ground into as fine a particle size as possible without extensively damaging the polyacrylamides. Such a particle size is approximately 75 microns. Alternatively, polyacrylamides may be ground prior to their dispersion in the carrier. It is also within the scope of this invention to first grind the polyacrylamides to a particle size of approximately 75 microns and then to disperse same within the carrier to form a dispersion of the desired composition.

The grinding step may be carried out in a conventional milling or grinding device, such as a ball mill, an attrition mill, or a friction grinder. Although faster, an attrition or friction mill tends to damage the polyacrylamides, apparently due to friction-generated heat buildup. If excessive polymer damage is observed, it can be controlled by suitable cooling apparatus. Ball milling tends to be slower but causes little damage to the polymers, and generally a cooling apparatus is not needed.

The prepared flocculant is capable of being metered and pumped, along with a supply of water, into and through a conventional mixing device such as an inline mixer. Such a mixing device customarily is essentially a water-tight chamber having mixing means and through which liquid can be pumped. Depending upon the mixing device utilized, the flowable flocculant and water can be introduced into the mixer either individually or in a combined stream. Upon mixing, the flowable flocculant quickly dissolves within the water.

After mixing, the solution can be pumped and metered into the water to be treated at flow rates acceptable for automated water treatment. The amount of polyacrylamides flocculant introduced into the water being treated is approximately 0.1 ppm to 2 ppm polyacrylamides (dry basis weight) per unit volume of water treated; that is, the polyacrylamides solid concentration in the treated water is within the approximate range of $10^{-5}$ to $2 \times 10^{-4}$. Concentrations greater than this range will not appreciably increase the degree of flocculation but will significantly increase the cost of flocculation. While greater concentrations are possible with the present invention, they are not desirable due to these two economic disincentives.

The polyacrylamides combine with the impurities in the water being treated, thereby agglomerating said impurities. The carrier (and thickening agent, if any) also dissolve in the water and remain dissolved in the treated water. The agglomerate is then separated from the treated water by any suitable, conventional means.

The following examples are presented to illustrate the invention. It will be understood that the specific embodiments and illustrations should not be taken in any manner as limiting the invention as defined in the appended claims.

EXAMPLE I

Into a ball mill was placed 400 g of anionic polyacrylamides, having an approximate molecular weight of about 12 to 15 million and 680 g dipropylene glycol. The polyacrylamides had an initial particle size of 350 microns or greater. The slurry was slowly milled for 24 hours, after which the particle size had been reduced to about 75 microns, the polyacrylamides exhibiting minimal damage. The viscosity of the thus produced fluid flocculant at 78°F. was found to be 80 poises. The fluid flocculant product was readily solvated with water within an in-line mixer and fed into a source of water to be treated. Impurities within the water were agglomerated and separated.

EXAMPLE II

A slurry of 30% polyacrylamides and 70% diethylene glycol was passed through an attrition grinder, such as a Moorehouse-Cowles Mill, a number of times. After each pass the clearance between the grinding stones was narrowed until a good dispersion was obtained. Cold water was passed through the cooling jacket to hold the temperature of the dispersion to below 100°F. during grinding, thereby avoiding polyacrylamides damage. A 1% by weight portion of polyvinyl pyrrolidone was added after the grinding process to control settling. The fluid flocculant dispersion was mixed with water and dissolved as in Example I.

EXAMPLE III

Dry polyacrylamides were ground through a friction grinder such as a Fitzpatrick Homoloid Impact Mill using liquid nitrogen to keep the product cold and friable. The powdered polymer was then dispersed in propylene glycol, using a ball mill. A silicate base clay settling agent (with 0.5% of a nonionic surfactant) was added in an amount of 0.5% by weight of the total composition to control settling. Mixing and solvating was accomplished as in Example I.

EXAMPLE IV

Dry polyacrylamides were ground in a conventional mill such as a Strong Scott Pulvocron Pulverizer until the particle size was reduced to about 75 microns. A quantity of 800 g of this material was then dispersed into 1180 g dipropylene glycol, using a high speed disperser. Polyvinyl pyrrolidone (20 g) was added as a suspending aid. The viscosity was found to be 175 poises at 85°F. This product, containing 40% by weight polyacrylamides, was used to treat the waste water from an edible oil manufacturing plant. This was accomplished by metering the fluid dispersion into a water stream, through an in-line mixer, and then feeding the aqueous solution immediately into the waste water going into a flotation separator. The following data indicate the effectiveness of this operation, when compared with a control treatment by an equal concentration of a conventionally prepared flocculant.

| Influent into Separator | |
|---|---|
| Total Solids | 4,250 ppm |
| Suspended Solids | 3,150 ppm |
| Ether Solubles | 2,800 ppm |
| Effluent Treated With 2 ppm Solids Content of a Conventionally Prepared Flocculant Solution: | |
| Total Solids | 1,400 ppm |
| Suspended Solids | 81 ppm |
| Ether Solubles | 80 ppm |
| Effluent Treated With 5 ppm of the 40% Polyacrylamides Solids Dispersion Prepared According to this Example: | |
| Total solids | 1,300 ppm |
| Suspended Solids | 67 ppm |
| Ether Solubles | 69 ppm |

It will be evident to one skilled in the art that modifications and variations of the invention as set forth herein may be made without departing from the spirit and scope of the invention; therefore, only such limitations should be imposed as are indicated in the appended claims.

I claim:

1. A fluidized flocculant for use in an aqueous system comprising a dispersion of a finely ground polyacrylamide flocculating agent in a polyhydric alcohol carrier having an approximate molecular weight greater than 65 and less than 500 said dispersion being flowable at room temperature, the concentration of said flocculating agent in the dispersion being substantially greater than the concentration dissolvable in the aqueous system.

2. The fluidized flocculant of claim 1, wherein the amount of said flocculating agent is within the approximate range of from 5 to 60 percent by weight of the total dispersion.

3. The fluidized flocculant of claim 1, wherein the carrier is a polyhydric alcohol selected from the group consisting of dipropylene glycol, propylene glycol, and diethylene glycol.

4. The fluidized flocculant of claim 1, said dispersion further including about 0.1 to about 20% by weight of a thickening agent soluble both in water and in said carrier.

5. The fluidized flocculant of claim 4, wherein the thickening agent is about 0.5 to about 10% by weight of the total dispersion.

6. The fluidized flocculant of claim 1, wherein the amount of said flocculating agent is from about 30 to 40% by weight of the total dispersion.

7. A method of producing a fluidized flocculant, comprising steps of: mixing from about 5 to 60 weight percent, based upon the total composition, of polyacrylamides together with a polyhydric alcohol carrier having an approximate molecular weight greater than 65 and less than 500 to form a slurry, and milling said slurry to a particle size of approximately 75 microns to form a dispersion.

8. The method of claim 7, wherein the amount of polyacrylamides in the mixing step is from 30 to 40 weight percent.

9. The method of claim 7, further comprising mixing into the dispersion from about 0.1 to 20 weight percent of a thickening agent soluble in both water and in said carrier.

10. A method of producing a fluidized flocculant comprising the steps of: grinding polyacrylamides to a particle size of approximately 75 microns, and mixing from about 5 to 60 weight percent of the ground polyacrylamides with a polyhydric alcohol carrier having an approximate molecular weight greater than 65 and less than 500 to form a flowable dispersion.

11. The fluidized flocculant of claim 1, wherein said finely ground polyacrylamide flocculating agent has a particle size of approximately 75 microns.

* * * * *

UNITED STATES PATENT OFFICE
CERTIFICATE OF CORRECTION

PATENT NO. : 3,941,739
DATED : March 2, 1976
INVENTOR(S) : Jack R. Newman

It is certified that error appears in the above-identified patent and that said Letters Patent are hereby corrected as shown below:

The patent should show on its face that it is assigned to Swift & Company of Chicago, Illinois.

Signed and Sealed this eighth Day of June 1976

[SEAL]

Attest:

RUTH C. MASON
*Attesting Officer*

C. MARSHALL DANN
*Commissioner of Patents and Trademarks*